(12) United States Patent
Geli Pons et al.

(10) Patent No.: US 12,257,544 B2
(45) Date of Patent: Mar. 25, 2025

(54) TUBULAR FILTER THAT ABSORBS ETHYLENE OR OTHER GASES, FOR REFRIGERATED TRANSPORT CONTAINERS

(71) Applicant: GREENKEEPER IBERIA, S.L., Madrid (ES)

(72) Inventors: Ramon Geli Pons, Madrid (ES); Monica Sabater Vilar, Madrid (ES); Carlos Geli Alegria, Madrid (ES); Carmen Moreno Guerrero, Madrid (ES)

(73) Assignee: GREENKEEPER IBERIA, S.L., Madrid (ES)

( * ) Notice: Subject to any disclaimer, the term of this patent is extended or adjusted under 35 U.S.C. 154(b) by 744 days.

(21) Appl. No.: 17/626,828

(22) PCT Filed: Jul. 23, 2020

(86) PCT No.: PCT/ES2020/070479
§ 371 (c)(1),
(2) Date: Jan. 13, 2022

(87) PCT Pub. No.: WO2021/014047
PCT Pub. Date: Jan. 28, 2021

(65) Prior Publication Data
US 2022/0297050 A1    Sep. 22, 2022

(30) Foreign Application Priority Data
Jul. 24, 2019    (ES) ............................... ES201930687

(51) Int. Cl.
*B01D 53/04* (2006.01)
*A01N 3/02* (2006.01)
(Continued)

(52) U.S. Cl.
CPC ....... *B01D 53/0415* (2013.01); *F25D 17/042* (2013.01); *B01D 2201/291* (2013.01);
(Continued)

(58) Field of Classification Search
CPC .......... B01D 53/0415; B01D 2201/291; B01D 2201/301; B01D 2257/7022;
(Continued)

(56) References Cited

U.S. PATENT DOCUMENTS 4,559,066 A    12/1985  Hunter et al.
9,108,143 B2    8/2015  Mugica Elorza et al.
(Continued)

FOREIGN PATENT DOCUMENTS

CN    203785368 U    8/2014
EP    0311454 A1    4/1989

OTHER PUBLICATIONS

Wills, R.B.H., Ku. V.V.V, Shohet, D. & Kim, G.H. (1999). Importance of low ethylene levels to delay senescence of non-climacteric fruit and vegetables. Aust. J. Expt. Agric. 39: 221-4.
(Continued)

*Primary Examiner* — Frank M Lawrence, Jr.
(74) *Attorney, Agent, or Firm* — Patenting Consulting Group; Roberto J Rios

(57) ABSTRACT

The invention relates to a tubular filter that absorbs ethylene or other gases for refrigerated transport containers, formed by a cylindrical tube of plastic mesh (2) with hermetic caps (3) at both ends, which contains granules that absorb ethylene or other gases, the mesh (2) having a structural configuration formed by an inner crown (20) having a circular filament (201), and an outer crown (21) having a wing-shaped filament (211), the base thereof being wider than the distal end thereof, thereby facilitating the entry of air flow into the tube. It further comprises a support acces-
(Continued)

sory (4) fixed in the container for which the filter (1) is intended, and it has an aerodynamic shape that helps to increase air flow through the filter (1) and liquid collection means.

12 Claims, 4 Drawing Sheets

(51) Int. Cl.
  *A23B 7/144* (2006.01)
  *F25D 17/04* (2006.01)
(52) U.S. Cl.
  CPC ............... *B01D 2201/301* (2013.01); *B01D 2257/7022* (2013.01); *B01D 2258/06* (2013.01); *B01D 2259/4508* (2013.01)
(58) Field of Classification Search
  CPC ........ B01D 2258/06; B01D 2259/4508; B01D 53/0407; B01D 53/0431; B01D 53/0446; B01D 53/72; B01D 53/82; B01D 2257/708; B01D 2259/4525; F25D 17/042; B01J 20/12; B01J 20/20; B01J 20/2805; A23B 7/152; A01N 3/00; A01N 3/02
  USPC .... 95/144; 96/134, 135, 139, 147, 148, 152, 96/154
  See application file for complete search history.

(56) References Cited

U.S. PATENT DOCUMENTS

| | | | |
|---|---|---|---|
| 9,403,116 | B2 | 8/2016 | Fleming, Jr. |
| 12,172,119 | B2* | 12/2024 | Malausa ................ B01D 46/10 |
| 12,208,346 | B2* | 1/2025 | Alper ..................... B01D 24/24 |
| 2014/0360374 | A1 | 12/2014 | Hatfield |
| 2021/0308602 | A1* | 10/2021 | De Bock ................ B01D 29/48 |

OTHER PUBLICATIONS

Wills, Ron B. H. et al. "Ripening of climacteric fruits initiated at low ethylene levels." Australian Journal of Experimental Agriculture 41 (2001): 89-92.
Neri, F., Cappellin, L., Spadoni, A., Cameldi, I., Algarra Alarcon, A., Aprea, E., Romano, A., Gasperi, F. and Biasioli, F. (2015), Role of strawberry volatile organic compounds in the development of *Botrytis cinerea* infection. Plant Pathol, 64: 709-717.
Ana Rodríguez, Victoria San Andrés, Magdalena Cervera, Ana Redondo, Berta Alquézar, Takehiko Shimada, José Gadea, María Rodrigo, Lorenzo Zacarías, Lluís Palou, María M. López, Pedro Castañera & Leandro Peña (2011) The monoterpene limonene in orange peels attracts pests and microorganisms, Plant Signaling & Behavior, 6:11, 1820-1823.

\* cited by examiner

TUBULAR FILTER THAT ABSORBS ETHYLENE OR OTHER GASES, FOR REFRIGERATED TRANSPORT CONTAINERS

OBJECT OF THE INVENTION

As expressed in the title of the present specification, the invention relates to a tubular filter that absorbs ethylene or other gases for refrigerated transport containers which confers to the function for which it is intended the advantages and features which are described in detail below and represent an improvement to the current state of the art.

More specifically, the object of the invention relates to an absorbent filter which, shaped in the form of a cylindrical tube of plastic mesh, closed at both ends with two hermetic caps, incorporates therein granulated materials that absorb ethylene or other gases, and are applicable for the absorption of ethylene or other volatile substances produced by fresh products such as fruits, vegetables, flowers, or ornamental plants transported in refrigerated containers, thereby preventing them from spoiling too soon, which is essentially distinguished in that it has an innovative weaving of the thread of the mesh and a novel support which improve its aerodynamic properties, significantly increasing the air flow going through it, which results in a more efficient reduction of air contaminants, and in that it has a new design incorporating fewer plastic materials and allowing less waste to be generated.

FIELD OF APPLICATION OF THE INVENTION

The field of application of the present invention is comprised within the sector of the industry dedicated to gas filtration, specifically in the manufacture of filters for absorbing ethylene and/or other volatile substances produced by fruits, vegetables, flowers, and ornamental plants, and other fresh products. More specifically, the product is intended for the wholesale transport of said fresh products in any type of refrigerated containers.

BACKGROUND OF THE INVENTION

As a reference to the state of the art, patent number ES2665250T3, belonging to OZEANO URDINA SL, which relates to an ethylene absorption filter for refrigerated spaces, should be mentioned.

The tubular filter that absorbs ethylene is widely used to protect fruits, vegetables, flowers, ornamental plants and other fresh products from the harmful effects of ethylene (ripening and senescence hormone) and other volatile compounds during transport. The tubular filter, filled with a granule that absorbs ethylene or other gases, is generally installed in the intake grating or upper part of the last pallets in the refrigerated containers by means of flanges which, in the case of the current Greenkeeper Iberia filter, are incorporated in the cap.

Right now, there are several companies on the market that sell different brands of said tubular filters on an international level (Greenkeeper Iberia SL, Bioconservacion SA, BioXTEND® Co, Ozeano Urdina SL and Sensitech Inc.) which essentially do not differ from one another, so the product has become a type of market standard. In fact, four of these companies (including Greenkeeper Iberia) make the cylindrical tube with a semirigid inner mesh and a flexible outer mesh, having exactly the same specifications and with only the colour changing. The cylindrical tubular filter by Ozeano incorporates materials and specifications of another type in its support material, but it essentially does not differ from the others either in terms of functionality.

Fresh products given off ethylene at a constant emission ratio ranging between about 0.01 and 4 µl/kg*h under the usual temperature and atmosphere conditions in refrigerated containers. The ethylene produced by the fresh products themselves builds up inside the container. It has been demonstrated that there is a linear relationship between the ripening time and the logarithm of the environmental concentration of ethylene at a given temperature and that ethylene is active as a hormone at concentrations as low as 5 ppb [Ku et al. Importance of low ethylene levels to delay senescence of non-climactic fruits and vegetables (1999). *Australian Journal of Experimental Agriculture* 39 (2) 221-224; Wills et al. Ripening of climacteric fruits initiated at low ethylene levels (2001). *Australian Journal of Experimental Agriculture* 41(1) 89-92].

Moreover, it has also been demonstrated that certain formed volatile compounds that are produced by fresh products (limonene, acetaldehyde, furaneol, ethyl-butonoate, etc.) act like gas signals that activate the germination and development of fungal spores [Neri et al. Role of strawberry volatile compounds in the development of *Botrytis cinerea* infection (2015). *Plant Pathology* 64 (3), 709-717; Rodriguez et al. The monoterpene limonene in orange peels attracts pests and microorganisms (2011). *Plant signalling and behaviour* 6(11):1820-3]

For the ethylene or other gases not to build up to levels that are harmful for fresh products, the filtration system must absorb them at a greater ratio than the ratio at which they are emitted. The faster the absorption is, the lower the concentration of environmental contaminating gases is and the better the conservation of the fresh products will be.

A factor limiting the contaminant absorption speed and capacity of the standard tubular filter is the air flow going through it. Tubular filters are placed in the grating of the filter precisely to increase the air flow volume going through it. However, the air flow volume passing through the standard filter could still be very considerably increased. In fact, the objective of the present invention is to develop a new filter with better aerodynamic properties which significantly increase the passage of air through same.

Moreover, it must be taken into account that these tubular filters are for a single use and most of them end up in landfills if they cannot be recycled. In order to reduce the waste generated and to market a more environmentally friendly product, a second objective of the invention is to develop a new filter which incorporates a smaller amount of plastic elements in its design and can also be manufactured with biodegradable plastic materials.

Finally, and as a reference to the current state of the art, it should be pointed out that at least the applicant is unaware of the existence of any other filter or any other invention having a similar application which presents technical, structural, and constitutive features identical or similar to those presented by the filter herein claimed.

DISCLOSURE OF THE INVENTION

The tubular filter that absorbs ethylene or other gases for transporting fresh products in refrigerated containers proposed by the invention is configured as an optimal solution to achieve the mentioned objectives, with the characterising details making it possible and distinguishing it being suitably described in the final claims attached to the present description.

More specifically, as mentioned above, the invention proposes a new type of filter, applicable for the absorption of ethylene or other volatile substances produced by fresh products such as fruits, vegetables, flowers, or ornamental plants transported in refrigerated containers, preventing them from spoiling too soon, said filter being formed as a cylindrical tube of plastic mesh, closed at both ends with two hermetic caps, incorporating therein granulated materials that absorb ethylene or other gases, and distinguished from those currently existing on the market basically by the following:

- an innovative weaving of the thread of its only tube of mesh, which allows a larger air flow to enter;
- a larger tube diameter and longer tube length to increase the amount of granule per unit of support material and to allow the use of a single tube when generally two are used;
- incorporation of a smaller amount of plastic material and the inclusion of biodegradable materials.

Furthermore, it is also optionally distinguished by having a support which even further reinforces the amount of air passing through the inside of the tube, which, advantageously, incorporates a liquid collection system and is fixed in the container for successive uses.

Specifically, the filter is formed with a single biodegradable or non-biodegradable plastic mesh, with a thread weave the structural configuration of which, formed from an inner crown having the same measurements as conventional meshes, and an outer crown changing from a round shape to a wing shape, provides aerodynamic properties, since it facilitates the entry of air into the tube, generating a suction effect on the air which significantly improves the air flow going through it and which, therefore, more efficiently absorbs air contaminants and keeps them at lower levels for the benefit of the fresh products being transported. Optionally, there is also a support which is placed in the grating in a fixed manner and remaining in the container for successive uses, even further increasing air flow, and it furthermore incorporates an innovative liquid collection system to prevent staining the load due to the accidental leakage of liquid permanganate which may occur, albeit very rarely.

In one embodiment, the filter is in accordance with the conventional dimensions of 40-45 mm in diameter and 50-100 cm in length, and in an alternative embodiment, it has larger dimensions: 45-55 mm in diameter and 50-120 cm in length.

In turn, the reduction of plastic elements in the filter object of the invention is due to the following:

- to the use of a single tubular mesh, instead two as occurs in conventional filters;
- to the increase in diameter and length of the filter, in the case of the embodiment having a larger diameter and length, to include more granules per unit of support material: and
- to the incorporation of biodegradable materials in the support material.

The invention therefore provides the market with a new type of cylindrical tubular filters that absorb ethylene that are more effective and more environmentally friendly.

Table 1 inserted below includes the range of preferred dimensions of the tubular filter object of the invention and also of the standard model currently available on the market.

TABLE 1

| Model | Outer Ø (mm) | Inner Ø (mm) | Length (cm) | Support |
|---|---|---|---|---|
| EF50 - EF100 (standard conventional model) | 42 (±1) | 39 (±1) | 50-100 | No |
| EF50 AS - EF100 AS | 40-45 (±1) | 37-42 (±1) | 50-100 | No |
| 2EF50 AS - 2EF100 AS | 45-55 (±1) | 42-52 (±1) | 50-150 | No |
| EF50 AS+ - EF 100 AS+ | 40-45 (±1) | 37-42 (±1) | 50-100 | Yes |
| 2EF50 AS+ - 2EF100 AS+ | 45-55 (±1) | 42-52 (±1) | 50-150 | Yes |

Air passage simulations were performed with said filter models using computer software (specifically, Ansys software), in standard filter EF100 (100 cm) without the outer mesh which this standard model also incorporates (so the result is more favourable than it is in reality) and the filter object of the invention in its four formats:
i) EF100AS (outer diameter 42 mm and length 100 cm),
ii) 2EF100 AS (outer diameter 55 mm and length 120 cm),
iii) EF100AS+ and iv) 2EF100AS+, wherein it was observed that up to 60% more air flow passes through the new filter formats than in standard filter EF100. In practice, this translates into a lower equilibrium concentration (of ethylene or other gases) inside the container and, therefore, less risk of the fresh products spoiling.

If a practical case of transport in a container is considered and simulation software which simulates the ethylene concentration inside the container taking into account the different variables (ethylene emission from the fresh product at the given atmospheric temperature and conditions, the total product mass, volume of the container, air flow through the filter, granule speed, etc.), it is possible to estimate the equilibrium concentration in the container (which is reached 10-15 hours after the container has been closed and depends on the emission ratio of the fresh products and on the absorption speed by the filter).

The graph in FIG. 7 represents a comparison of the equilibrium concentration estimated in a container with an ethylene emission of 0.1 µ/kg*h obtained with the different standard filter models and according to the invention. The vertical axis of the graph includes the amount of ethylene concentration (ppm), and the horizontal axis includes the time (hours). Specifically, the following filter models have been compared:

- a standard filter EF75 (outer Ø 42 mm, length 75 cm),
- two standard filters EF75,
- a standard filter EF100 (outer Ø 42 mm, length 100 cm),
- two standard filters EF100,
- a filter according to the invention 2EF100AS (outer Ø 55 mm, length 100 cm),
- two filters object of the invention EF100AS (outer Ø 42 mm, length 100 cm),
- two filters object of the invention 2EF100AS (outer Ø 55 mm, length 100 cm) and
- two filters object of the invention EF100AS+(EF100AS with support).

In view of said graph, it can be seen that the filters object of the invention, and particularly model EF100AS+, that is, the one formed by two filters with an outer 0 diameter of 55 mm, length of 100 cm and support, obtain clearly lower ethylene concentrations than the standard filters currently existing on the market do.

DESCRIPTION OF THE DRAWINGS

To complement the description that is being made and for the purpose of helping to better understand the features of the invention, a set of drawings is attached to the present specification as an integral part thereof, wherein the following is depicted in an illustrative and non-limiting manner.

Finally.

PREFERRED EMBODIMENT OF THE INVENTION

Figure 1:
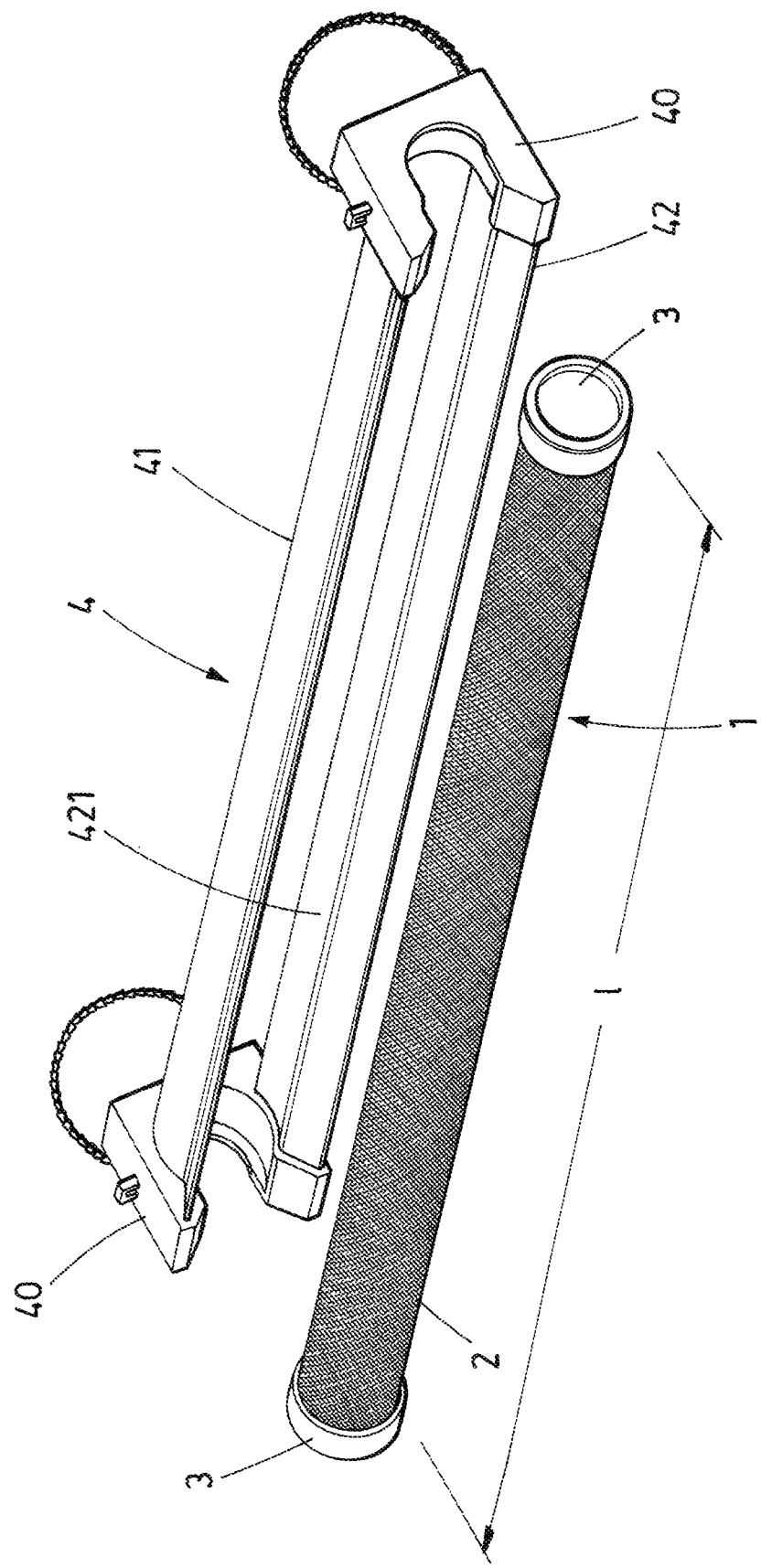
FIG. 1 shows a perspective view of an embodiment of the tubular filter that absorbs ethylene or other gases for refrigerated transport containers object of the invention, represented together with the support that it optionally has, where the essential parts comprised therein can be seen.
Figure 2:
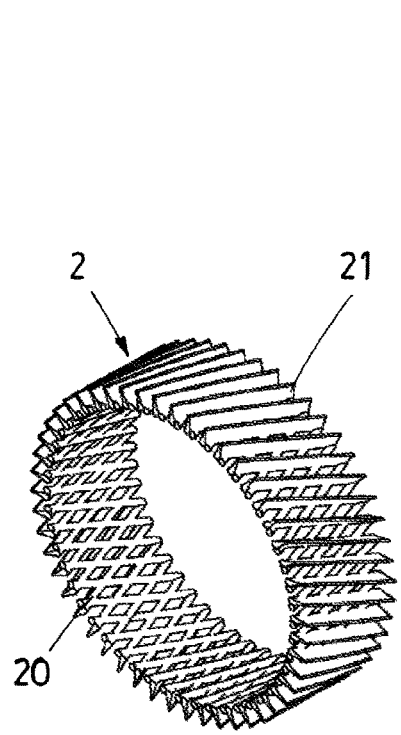
FIG. 2 shows a perspective view of a segment of the tubular mesh of the filter according to the invention, where the configuration thereof can be seen.
Figure 3:
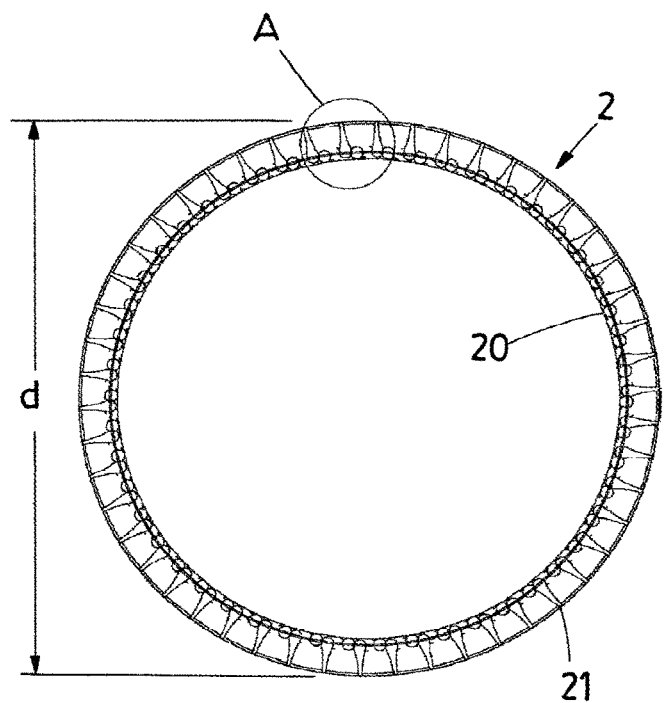
FIG. 3 shows a cross-section view of the tubular mesh, showing the diameter thereof.
Figure 4:
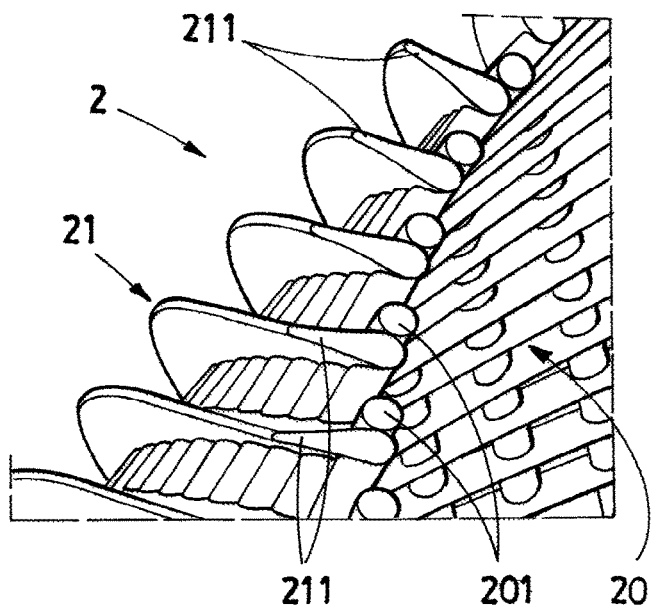
FIG. 4 shows an enlarged perspective view of a detail of the tubular mesh of the filter object of the invention, wherein the different configurations of the filaments forming the two crowns of the mesh can more clearly be seen.

In view of the mentioned figures and according to the numbering used, a preferred embodiment of the tubular filter of the invention, comprising that indicated and described in detail below, can be observed in said figures.

Therefore, as observed in said figures, the filter (1) in question is formed in a known manner by a cylindrical tube of plastic mesh (2), closed at both ends with respective hermetic caps (3), which internally incorporates granulated materials that absorb ethylene or other gases, and it is essentially distinguished by the fact that said mesh (2) has a structural configuration which facilitates the entry of air flow into the tube, being formed by the combination of an inner crown (20) formed by filament having a circular section (201) and an outer crown (21) formed by a filament which, instead of being circular, has a wing-shaped section configuration (211), wherein the circular base thereof is wider than the distal end thereof (FIGS. 1 to 5).

Figure 5:
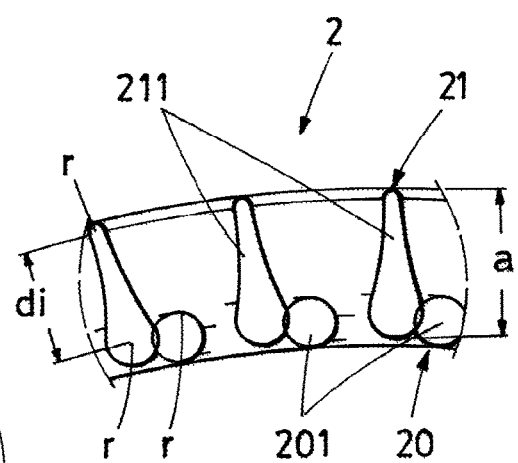
FIG. 5 shows an enlarged view of detail A indicated in FIG. 3, wherein the configuration and dimensions of the filaments of the mesh can likewise be seen.

In the preferred embodiment, said tube of mesh (2), which is made of a plastic material as mentioned, being produced by a horizontal extrusion system rotating counter-clockwise and with air cooling, preferably has dimensions with an outer diameter (d) of between 40 and 55 mm and a length (l) of between 50 and 150 cm, wherein the circular filament (201) of the inner crown (20) preferably has conventional measurements, i.e., a radius (r) of 0.5 mm, whereas in the outer crown (21), the base of the wing-shaped filament (211) also has a radius (r) of 0.5 mm, the upper part has a radius (r) of 0.15 mm, and the distance (di) between the center of both is 2.30 mm, the total height (a) of said wing-shaped filament (211) being 2.95 mm, as shown in FIG. 5.

The preferred material of the plastic mesh (2) is HDPE (high density polyethylene), combined or not combined with glass fibre, but there can also be another type of material. Optionally, however, it can also be manufactured from biodegradable materials biodegradable such as PLA (polylactic acid).

Optionally, the filter (1) comprises a support accessory (4) which is installed in a fixed manner on the grating of the container for which the filter (1) is intended, allowing for a successive use, since it can be readily incorporated in and removed from same, which considerably facilitates the operation of installing and changing the filter (1). In addition to serving as a support, this accessory also helps to increase air flow through the filter (1) even further due to its aerodynamic shape, and to prevent accidents due to staining the load by means of its liquid collection system.

Figure 6:
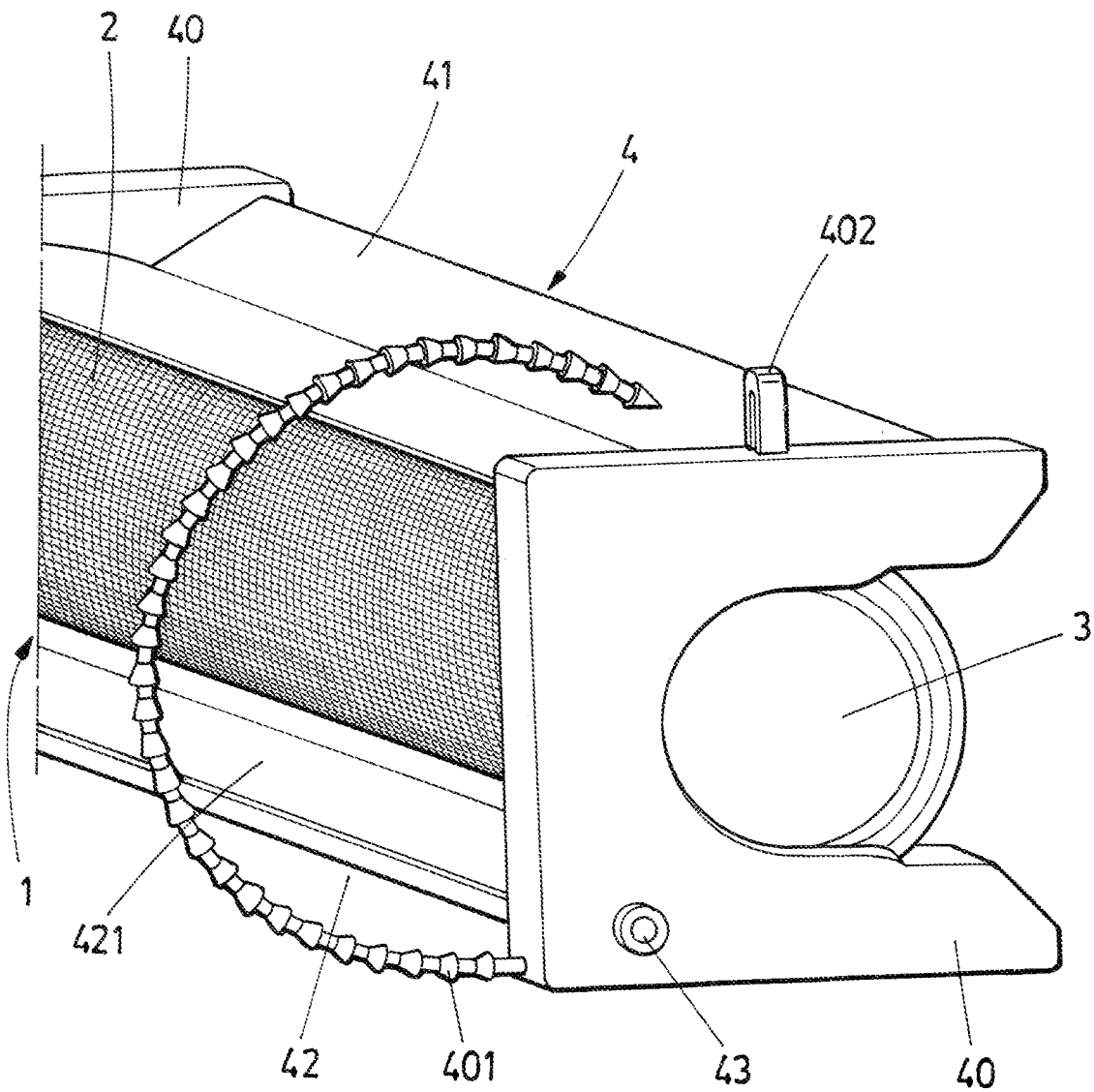
FIG. 6 shows a perspective view of an end of the tubular filter, according to the invention, once incorporated in the support, where the liquid collection system it has can be seen.
Figure 7:
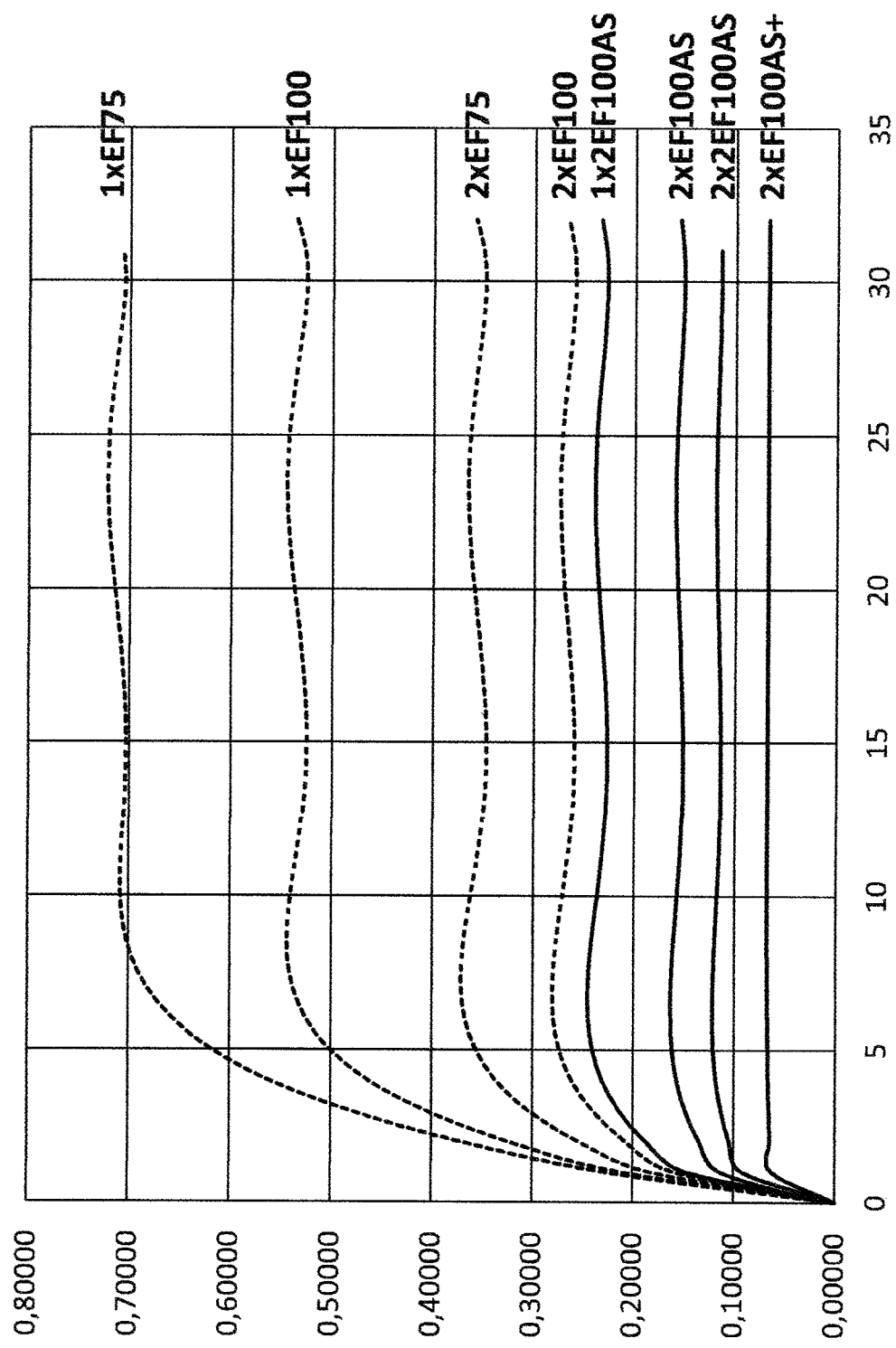
FIG. 7 shows the graph mentioned in the previous section which compares the estimated ethylene concentration in a container with an ethylene emission of 0.1 μ/kg*h obtained with different conventional filter models and filter models according to the invention.

To that end, as observed in FIGS. 1 and 6, said support accessory (4) consists of an elongate element made of plastic material which incorporates respective anchors (40) at the ends thereof suitable for being adapted to the different diameters and lengths of the filter (1), and between which there are provided two longitudinal parts, an upper longitudinal part (41) and a lower longitudinal part (42) between which the filter (1) is arranged, having an approximately planar configuration, causing them to function like 'wings' forcing the air to pass through the filter (1).

In the preferred embodiment, said anchors (40) are formed by respective C-shaped parts suitable for receiving the caps (3) of the ends of the tube of mesh (2) of the filter (1), providing an adjustable closure (401) which, by way of a flange that can be inserted into an eyelet (402), serves to secure the holding of same.

Furthermore, the inner face (421) of the longitudinal part or lower wing (42) defines a passageway serving to collect the liquid which may accidentally form in the filter (1), albeit very rarely.

Likewise, at least at one end of the support accessory (4) there is provided an opening (43) which communicates with said inner face (421) of the lower wing (42) and which, by means of inserting a hose (not depicted), can be connected to a collection vessel for said liquid (FIG. 6).

In the preferred embodiment, the filtration means contained inside the tube of mesh (2) of the filter (1) consist of spherical granules or pellets formed from a natural, highly pure clayey base and potassium or sodium permanganate with or without active charcoal, although it can contain any type of granules.

Likewise, the filter (1) can have any of the weights and sizes within the usual range of tubular filters that absorb ethylene or other gases; however, the preferred size is 120 cm and the preferred outer diameter is 55 mm for containing 2 kg of granules, since this format can replace a currently more widespread practice of using 2 tubular filters measuring 1 meter and 1 kg of granules in the grating of the container, thereby reducing the amount of plastic material forming same and, accordingly, the waste generated once its service life has ended.

Having sufficiently described the nature of the present invention as well as the manner of putting it into practice, it is not considered necessary to expand on the explanation so that any person skilled in the art can comprehend its scope and the advantages derived from same, whereby stating that, within its essential nature, it may be carried out to practice in other embodiments that differ in detail from the embodiment indicated by way of example, and it will likewise receive the protection that is sought provided that the fundamental principle thereof is not altered, changed, or modified.

The invention claimed is:

1. A tubular filter that absorbs ethylene or other gases for refrigerated transport containers, formed by a cylindrical tube of plastic mesh (2), closed at both ends with respective hermetic caps (3), which internally incorporates granulated materials that absorb ethylene or other gases, characterized by said plastic mesh (2) having a structural configuration which facilitates the entry of air flow into the cylindrical tube, being formed by the combination of an inner crown (20) formed by a filament having a circular section (201), and an outer crown (21) formed by a filament having a wing-shaped section configuration (211), wherein a circular base thereof is wider than a distal end thereof, thereby facilitating the entry of air flow into the tube.

2. The tubular filter that absorbs ethylene or other gases for refrigerated transport containers according to claim 1, characterized in that the circular filament (201) of the inner crown (20) has a radius (r) of 0.5 mm, and in the outer crown (21), a base of the wing-shaped filament (211) has a radius (r) of 0.5 mm, an upper part has a radius (r) of 0.15 mm, and a distance (di) between a center of both radii of the wing-shaped filament is 2.30 mm, with a total height (a) of said wing-shaped filament (211) being 2.95 mm.

3. The tubular filter that absorbs ethylene or other gases for refrigerated transport containers according to claim 1, further comprising a support accessory (4) which is configured to be installed in a fixed manner in a grating of the container, wherein the filter can be readily incorporated and removed for the operation of installing and changing the filter (1).

4. The tubular filter that absorbs ethylene or other gases for refrigerated transport containers according to claim 3, characterized in that the support accessory (4) has an aerodynamic shape that helps to increase air flow through the filter (1), as well as liquid collection means.

5. The tubular filter that absorbs ethylene or other gases for refrigerated transport containers according to claim 4, characterized in that the support accessory (4) consists of an elongate element made of plastic material which incorporates respective anchors (40) at the ends thereof suitable for being adapted to the different diameters and lengths of the filter (1), and between which there are provided two longitudinal parts, an upper longitudinal part (41) and a lower longitudinal part (42), between which the filter (1) is arranged, having an approximately planar configuration causing them to function like wings forcing the air to pass through the filter (1).

6. The tubular filter that absorbs ethylene or other gases for refrigerated transport containers according to claim 5, characterized in that said anchors (40) are formed by respective C-shaped parts suitable for receiving the caps (3) of the ends of the tube of mesh (2) of the filter (1), providing an adjustable closure (401) which, by way of a flange that can be inserted into an eyelet (402), serves to secure the holding of the same.

7. The tubular filter that absorbs ethylene or other gases for refrigerated transport containers according to claim 5, characterized in that the inner face (421) of the lower longitudinal part (42) defines a passageway serving to collect a liquid that may accidentally form in the filter (1).

8. The tubular filter that absorbs ethylene or other gases for refrigerated transport containers according to claim 7, characterized in that at least at one end of the support accessory (4), there is provided an opening (43) which communicates with the inner face (421) of the lower wing (42) and which, by means of inserting a hose, can be connected to a collection vessel for said liquid.

9. The tubular filter that absorbs ethylene or other gases for refrigerated transport containers according to claim 1, characterized in that the tube of plastic mesh (2) has dimensions with an outer diameter (d) of between 40 and 55 mm and a length (1) of between 50 and 150 cm.

10. The tubular filter that absorbs ethylene or other gases for refrigerated transport containers according to claim 1, characterized in that the plastic mesh (2) is either HDPE combined or not combined with glass fiber.

11. The tubular filter that absorbs ethylene or other gases for refrigerated transport containers according to claim 1, characterized in that the plastic mesh (2) is manufactured from biodegradable materials.

12. The tubular filter that absorbs ethylene or other gases for refrigerated transport containers according to claim 11, wherein said biodegradable materials comprise polylactic acid (PLA).

* * * * *